(12) United States Patent
Chen et al.

(10) Patent No.: US 10,228,230 B2
(45) Date of Patent: Mar. 12, 2019

(54) MEASUREMENT TOOL FOR CIRCUMFERENCE

(71) Applicant: National Taiwan Normal University, Taipei (TW)

(72) Inventors: Jung-Hsuan Chen, Taipei (TW); Chin-Guo Kuo, Taipei (TW); Chao-Fu Shu, Taipei (TW)

(73) Assignee: National Taiwan Normal University, Taipei (TW)

( * ) Notice: Subject to any disclaimer, the term of this patent is extended or adjusted under 35 U.S.C. 154(b) by 96 days.

(21) Appl. No.: 15/449,400

(22) Filed: Mar. 3, 2017

(65) Prior Publication Data

US 2018/0188012 A1 Jul. 5, 2018

(30) Foreign Application Priority Data

Dec. 30, 2016 (TW) .............................. 105144066 A (51) Int. Cl.
| | | |
|---|---|---|
| *G01B 3/02* | (2006.01) | |
| *G01B 3/04* | (2006.01) | |
| *G01B 3/11* | (2006.01) | |
| *G01B 5/02* | (2006.01) | |
| *G09B 19/00* | (2006.01) | |
| *G09B 23/04* | (2006.01) | |

(52) U.S. Cl.
CPC .............. *G01B 5/025* (2013.01); *G01B 3/02* (2013.01); *G01B 3/04* (2013.01); *G01B 3/11* (2013.01); *G09B 19/00* (2013.01); *G09B 23/04* (2013.01)

(58) Field of Classification Search
CPC . G01B 5/025; G01B 3/02; G01B 3/04; G01B 3/11; G09B 19/00; G09B 23/04
USPC .... 33/511–512, 514.1, 514.4, 732, 734, 735, 33/743, 755, 756, 759, 815
See application file for complete search history.

(56) References Cited

U.S. PATENT DOCUMENTS

| | | | | |
|---|---|---|---|---|
| 146,974 | A * | 2/1874 | Allen ........................ | A44C 9/02 33/514.1 |
| 438,453 | A * | 10/1890 | Wareham et al. ........ | G01B 3/34 33/514.1 |
| 458,564 | A * | 9/1891 | Engel ........................ | G01B 3/34 33/514.1 |
| 524,589 | A * | 8/1894 | Gruebel .................... | A44C 9/02 33/514.1 |
| 789,352 | A * | 5/1905 | Badger ................. | G01B 3/1056 33/758 |

(Continued)

*Primary Examiner* — R. A. Smith
*Assistant Examiner* — Tania Courson
(74) *Attorney, Agent, or Firm* — Muncy, Geissler, Olds & Lowe, P.C.

(57) ABSTRACT

A measurement tool for circumference includes at least one disk with a circumference thereof provided with a through hole; a straightedge provided with a fixed post and a plurality of scales, and the fixed post penetrates through the through hole to fix the disk to the fixed post; and a hitching line with one end thereof penetrated by the fixed post, and the other end of the hitching line surrounds the disk or straightens along the straightedge. Thus, a string makes a circle around the circumference, whereby the string is marked an index corresponding to the fixed post, and then the string straightens along the straightedge, and a length of the circumference of the disk is obtained according to relative positions of the scales and the index.

9 Claims, 6 Drawing Sheets

(56) References Cited

U.S. PATENT DOCUMENTS

| | | | | | |
|---|---|---|---|---|---|
| 1,062,525 | A | * | 5/1913 | Ward | G01B 3/34 33/514.1 |
| 1,216,672 | A | * | 2/1917 | Eisen | G01B 3/34 33/514.1 |
| 1,404,601 | A | * | 1/1922 | Gordon | G01B 5/025 33/555.4 |
| 1,442,985 | A | * | 1/1923 | Toy | G01B 3/34 33/514.1 |
| 1,448,222 | A | * | 3/1923 | Johnston | G01B 5/025 33/555.4 |
| 1,634,378 | A | * | 7/1927 | Mountford | G01B 3/34 33/514.1 |
| 1,667,802 | A | * | 5/1928 | Homan, Jr. | A43D 1/02 33/3 A |
| 1,978,682 | A | * | 10/1934 | Marvin | G01B 5/08 33/555.4 |
| 2,205,626 | A | * | 6/1940 | Mason | A61B 5/107 2/300 |
| 2,262,664 | A | * | 11/1941 | Bresson | G01B 3/1002 33/555.4 |
| 2,586,074 | A | * | 2/1952 | Memluck | G01C 15/00 33/1 LE |
| 2,977,684 | A | * | 4/1961 | Campanile | A41H 1/02 33/12 |
| 3,183,601 | A | * | 5/1965 | Niles | G01B 5/08 33/542 |
| 3,744,140 | A | * | 7/1973 | Kyrk | G01B 3/34 33/514.1 |
| 3,967,383 | A | * | 7/1976 | Collins | G01B 5/025 33/555 |
| 4,517,747 | A | * | 5/1985 | Morin | A61B 3/107 33/512 |
| D281,301 | S | * | 11/1985 | Spolar | D10/46.2 |
| 4,569,139 | A | * | 2/1986 | Wakeling | G01B 5/025 33/555.4 |
| 4,914,821 | A | * | 4/1990 | Hurt | G01B 5/025 33/555.4 |
| 5,067,246 | A | * | 11/1991 | Hesske | G01B 3/1084 33/555.4 |
| 5,103,571 | A | * | 4/1992 | Richards | G01B 5/201 33/555.4 |
| 5,452,523 | A | * | 9/1995 | Jansen | B65D 63/00 24/23 R |
| 5,613,302 | A | * | 3/1997 | Berman | G01B 5/025 33/514.2 |
| 6,009,631 | A | * | 1/2000 | Gensler | G01B 5/0035 33/555.1 |
| 6,253,459 | B1 | * | 7/2001 | Barnhill | G01B 5/025 33/514.1 |
| 6,279,244 | B1 | * | 8/2001 | Kelley | A44C 9/02 33/512 |
| 6,286,224 | B1 | * | 9/2001 | Lewis | G01B 3/14 33/512 |
| 6,575,068 | B2 | * | 6/2003 | Lira-Nunez | B26B 3/00 30/151 |
| 6,615,504 | B2 | * | 9/2003 | Oser | A61B 5/107 33/512 |
| 8,020,439 | B2 | * | 9/2011 | Gougian | G01F 19/00 73/426 |
| 9,360,293 | B2 | * | 6/2016 | Morfino | G01B 5/20 |

\* cited by examiner

MEASUREMENT TOOL FOR CIRCUMFERENCE

This application claims priority for Taiwan patent application no. 105144066 filed on Dec. 30, 2016, the content of which is incorporated in its entirely.

BACKGROUND OF THE INVENTION

Field of the Invention

The present invention relates to a teaching tool, particularly to a measurement tool for circumference.

Description of the Related Art

Science is based on mathematics. Mathematics is divided into geometry and algebra. Geometry involves with calculations for various areas and volumes. However, it is difficult for students to understand how an equation is established only by numerals. Although a picture can be drawn or established in one's mind, no teaching tools interest students. As a result, they cannot enjoy mathematics, even fears and hates it.

Presently, an approximate value $\pi$ of a circumference ratio is estimated by a circumference and either of a circumscribed square area or an inscribed square area thereof. However, it is very inconvenient for beginning learners to understand the estimation method. Furthermore, the beginning learners cannot understand the estimation method. Apparently, learning interests and application logic are seriously affected.

To overcome the abovementioned problems, the present invention provides a measurement tool for circumference, so as to solve the afore-mentioned problems of the prior art.

SUMMARY OF THE INVENTION

A primary objective of the present invention is to provide a measurement tool for circumference, which installs a disk with a known diameter on a straightedge, uses a line segment of a string to make a circle around the disk, and straightens the line segment along the straightedge to measure a length of the line segment. Thus, an equation of calculating a length of a circumference is applied in practice, so that students more easily understand how to calculate the length of the circumference.

Another objective of the present invention is to provide a measurement tool for circumference, which divides the measured length of the circumference by the known diameter of the disk to obtain a ratio of the circumference. Thus, the present invention can calculate a value of the ratio of the circumference. The ratio of the circumference is no longer a fixed value. Besides, students can understand how to calculate the ratio of the circumference.

To achieve the abovementioned objectives, the present invention provides an measurement tool for circumference, which comprises at least one disk, a straightedge and a hitching line. A circumference of the disk is provided with a through hole. The straightedge is provided with a fixed post and a plurality of scales, and the fixed post penetrates through the through hole to fix the disk to the fixed post. One end of the hitching line is penetrated by the fixed post, and the other end of the hitching line surrounds the disk or straightens along the straightedge.

In an embodiment of the present invention, the fixed post is arranged at the scale of the straightedge which is 0.

In an embodiment of the present invention, there is a plurality of disks arranged on the fixed post, and size of the plurality of disks is sequentially reduced from bottom to top, and the largest one of the plurality of disks is arranged in the bottom.

In an embodiment of the present invention, the lowest one of the plurality of disks, the straightedge and the fixed post are integrally formed as a piece. A thickness of the lowest one of the plurality of disks is larger than a thickness of the straightedge, and the hitching line uses the fixed post to surround the lowest one of the plurality of disks.

In an embodiment of the present invention, the through hole of the disk is an arc nick.

In an embodiment of the present invention, the hitching line has a string and a loop arranged at one end of the string, and the loop hitches the fixed post. A length of the string is larger than a length of the circumference of the disk.

In an embodiment of the present invention, a length of the straightedge is larger than the length of the circumference of the disk.

In an embodiment of the present invention, the string makes a circle around the circumference of the disk, whereby the string is marked an index whose position corresponds to a position of the fixed post, and then the string straightens along the straightedge, and the length of the circumference of the disk is obtained according to relative positions of the scales and the index.

Below, the embodiments are described in detail in cooperation with the drawings to make easily understood the technical contents, characteristics and accomplishments of the present invention.

DETAILED DESCRIPTION OF THE INVENTION

The present invention provides a measurement tool for circumference used as a teaching tool, which combines a disk, a straightedge and a string, uses the string to measure a length of a circumference of the disk, and uses the straightedge to measure a length of the string surrounding the disk to obtain the length of the circumference of the disk. Thus, students can intuitively understand the length of the circumference.

Figure 1:
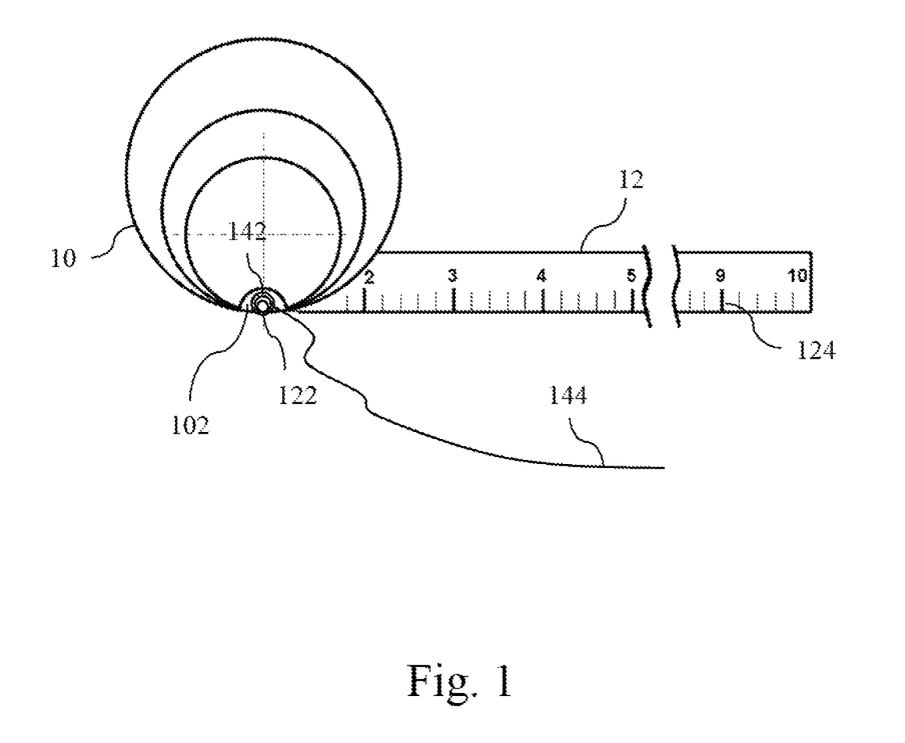
FIG. 1 is a diagram schematically showing a measurement tool for circumference according to an embodiment of the present invention.
Figure 2:
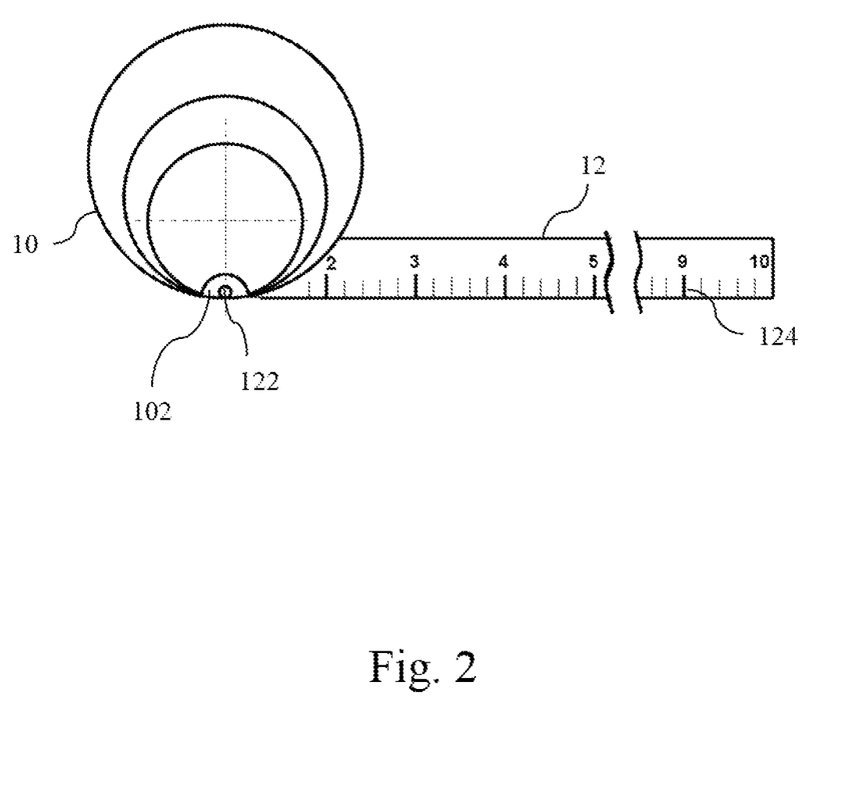
FIG. 2 is a top view of a disk and a straightedge of the measurement tool for circumference according to an embodiment of the present invention.
Figure 4:
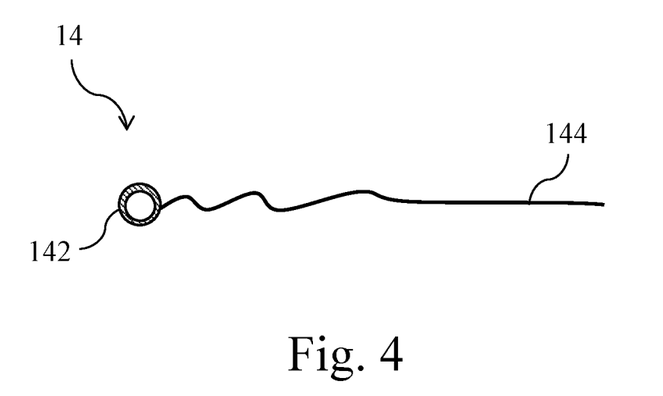
FIG. 4 is a diagram schematically showing a hitching line according to an embodiment of the present invention.
Figure 6:
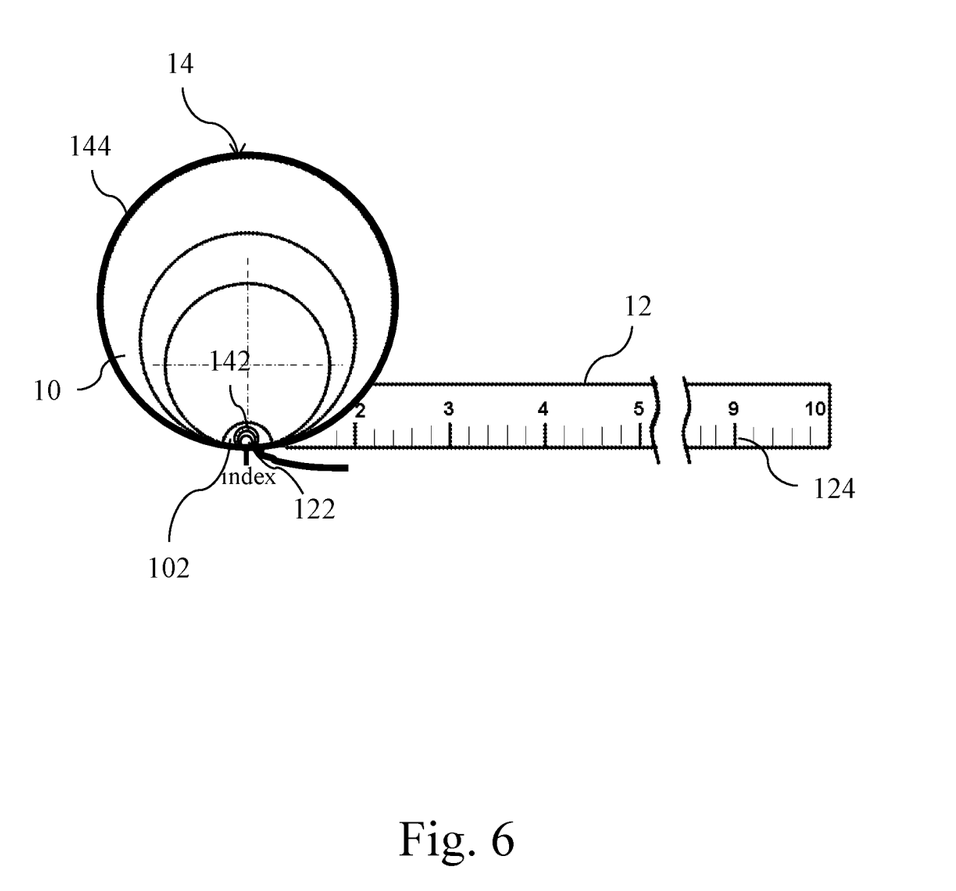
FIG. 6 is a diagram schematically showing that the string makes a circle around the disk according to an embodiment of the present invention.
Figure 7:
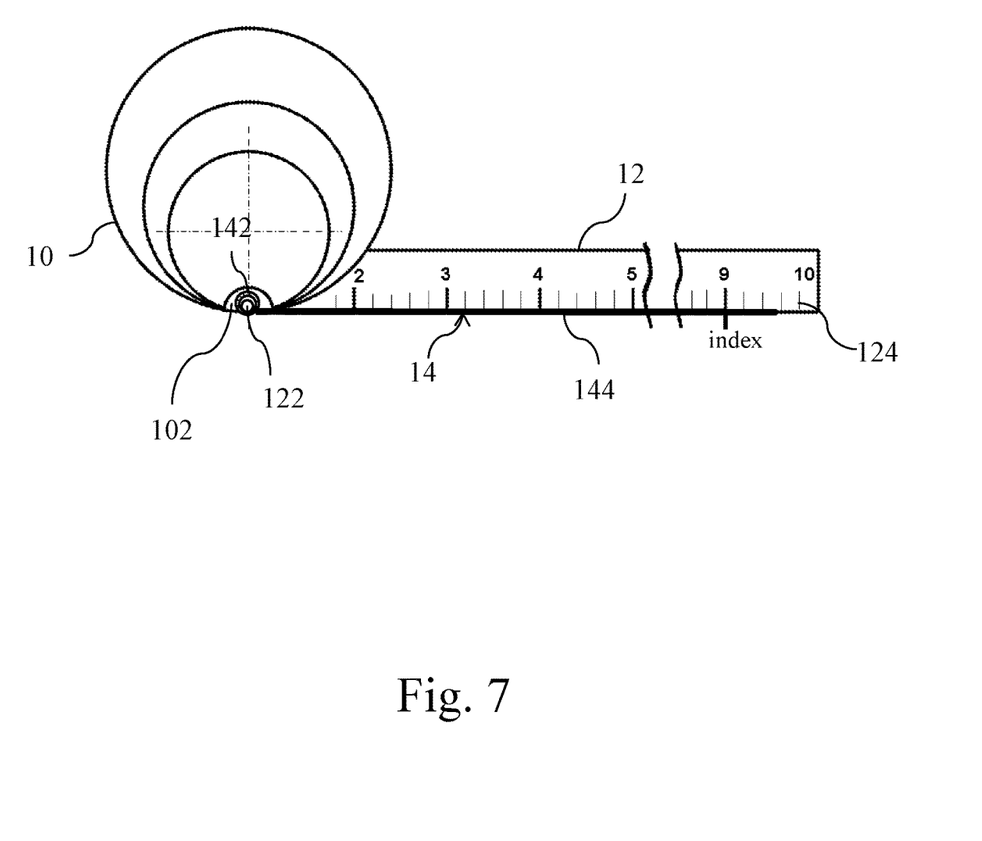
FIG. 7 is a diagram schematically showing that straightens along the straightedge according to an embodiment of the present invention.

Refer to FIG. 1 and FIG. 2. FIG. 1 is a diagram schematically showing a measurement tool for circumference according to an embodiment of the present invention. The measurement tool for circumference comprises at least one disk 10, a straightedge 12 and a hitching line 14. FIG. 2 is a top view of the disk 10 and the straightedge 12 of the measurement tool for circumference according to an embodiment of the present invention. A circumference of the disk 10 is provided with a through hole 102. In the embodiment, the through hole 102 is an arc nick. The straightedge 12 is provided with a fixed post 122 and a plurality of scales 124. The fixed post 122 is arranged at the scale 124 of the straightedge 12 which is 0. The fixed post 122 is vertical to the straightedge 12. In an embodiment, the fixed post 122 and the straightedge 12 are integrally formed as a piece. The scale 124 has a measurement unit of centimeter or millimeter. The fixed post 122 is arranged at a position of 0. The scales 124 are natural numbers and sequentially increased from 0. The fixed post 122 penetrates through the through hole 102 to fix the disk 10 to the fixed post 122. Refer to FIG. 4, which is a diagram schematically showing the hitching line 14 according to an embodiment of the present invention. The hitching line 14 has a string 144 and a loop 142 fixed at one end of the string 144. For example, the hitching line 14 is cotton thread, hemp rope or plastic string. Since a diameter of a central hole of the loop 142 is larger than a diameter of the fixed post 122, the loop 142 hitches the fixed post 122. The string 144 surrounds the disk 10 (as shown in FIG. 6) or straightens along the straightedge 12 (as shown in FIG. 7).

Figure 3:
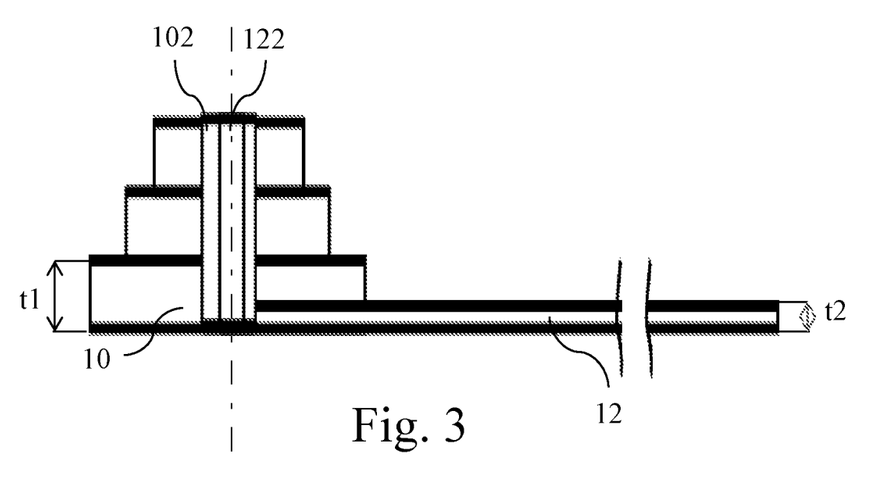
FIG. 3 is a sectional view of the disk and the straightedge of the measurement tool for circumference according to an embodiment of the present invention.

There is a plurality of disks 10, as shown in FIG. 2 and FIG. 3. The diameters of the disks 10 are different. The larger disk 10 is closer to the bottom. The disks 10 whose size is sequentially reduced from bottom to top sleeve the fixed post 122 with the fixed post 122 being an axis. In FIG. 1, FIG. 2 and FIG. 3, there are three disks 10. The through hole 102 of each disk 10 is arranged on an identical axis realized with the fixed post 122.

The disk 10 and the straightedge 12 are integrally formed as a piece or separate. When the disk 10 and the straightedge 12 are separate, all the disks 10 sleeve the fixed post 122 on the straightedge 12. When the disk 10 and the straightedge 12 are integrally formed as a piece, the disks 10 cannot be moved and taken. The disks 10 are like a circular ladder. In addition, the disk 10 and the straightedge 12 are semi-separate. In such a case, the lowest disk 10, the straightedge 12 and the fixed post 122 are integrally formed as a piece, and the other disks 10 are arranged on the lowest disk 10 to sleeve the fixed post 122 with the fixed post 122 being an axis. That is to say, the fixed post 122 grows from the lowest disk 10.

A thickness of each disk 10 is larger than or equal to a thickness of the string 144 such that the string 144 surrounds the disk 10. If the lowest disk 10 and the straightedge 12 are integrally formed as a piece, a thickness t1 of the lowest disk 10 is larger than a thickness t2 of the straightedge 12. Thus, as shown in FIG. 6, the string 144 starts from the fixed post 122 to make a circle around the lowest disk 10.

A length of the string 144 is larger than a length of the circumference of the disk 10 whereby the string 144 makes a circle around the disk 10. Besides, a length of the straightedge 12 is larger than the length of the circumference of the disk 10, otherwise the length of the circumference of the disk 10 cannot be measured.

Figure 5:
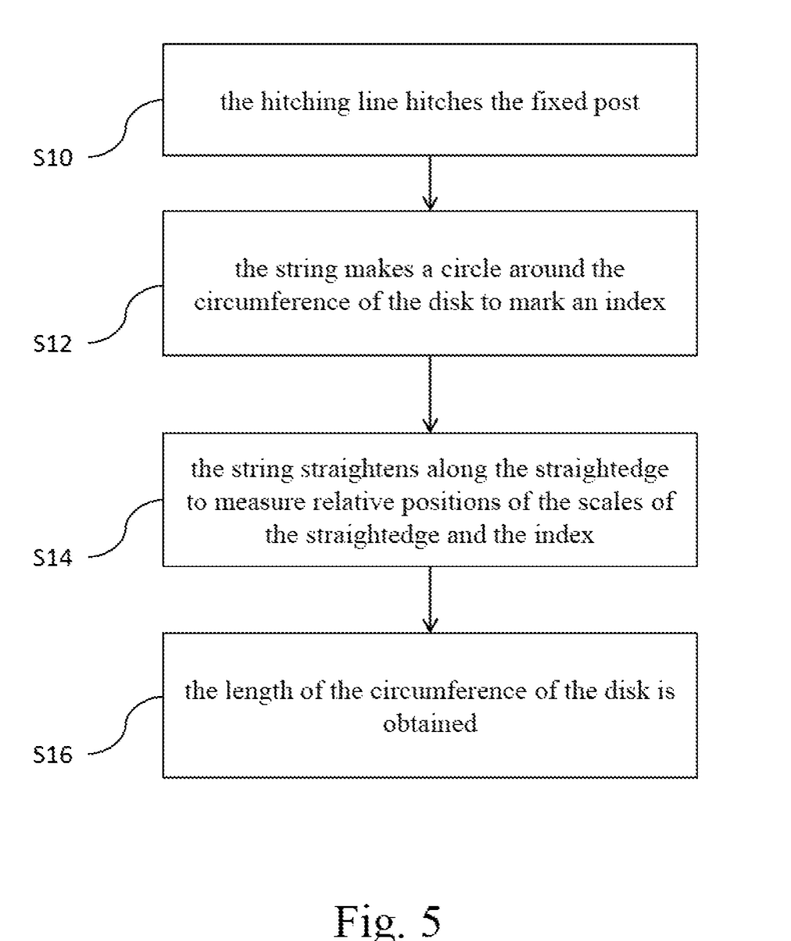
FIG. 5 is a flowchart of measuring a length of a circumference of the disk according to an embodiment of the present invention.

FIG. 5 is a flowchart of measuring the length of the circumference of the disk according to an embodiment of the present invention. In Step S10, the fixed post is hitched by the hitching line. Then, in Step S12, the string makes a circle around the circumference of the disk, whereby the string is marked an index whose position corresponds to a position of the fixed post, which represents that the length of the string is equal to the length of the circumference of the disk. In Step S14, the string straightens along the straightedge, and the length of the circumference of the disk is obtained according to relative positions of the scales of the straightedge and the index, as shown in Step S16.

Furthermore, since a diameter of a circle is multiplied by a circumference ratio to obtain a length of a circumference of the circle. In other words, when the diameter of the disk is known and the length of the circumference is obtained, the length of the circumference is divided by the diameter of the disk to obtain the circumference ratio.

For example, the diameter of the disk is 3.183 cm. The string of the hitching line makes a circle around the circumference of the disk, as shown in FIG. 6, whereby the string is marked an index "index" whose position corresponds to the position of the fixed post, and then the string straightens along the straightedge, as shown in FIG. 7. In the embodiment, the index "index" is located at a position of 10 cm. On the other hand, the length of the circumference of the disk is 10 cm. The length of the circumference of the disk of 10 cm is divided by the diameter of the disk of 3.183 cm to obtain the circumference ratio equal to 3.14. Since the scales of the straightedge that can be seen by a naked eye are insufficiently precise, there is an error between a real circumference ratio and the calculated circumference ratio. However, learning beginnings are interested in how to manually calculate the circumference ratio.

In conclusion, the measurement tool for circumference of the present invention installs the disk with a known diameter on the straightedge and fixes one end of the hitching line at a point of the circumference of the disk. The hitching line makes a circle around the disk to obtain a line segment equal to the circumference length, and then the line segment straightens along the straightedge to measure the length of the line segment. Thus, an equation of calculating the circumference length is applied in practice, so that students more intuitively understand how to calculate the circumference length. On top of that, the measured circumference length is divided by the known diameter of the disk to obtain the circumference ratio. As a result, the present invention can calculate the value of the circumference ratio. The circumference ratio is no longer a fixed value. Students can understand how to calculate the circumference ratio.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A measurement tool for circumference comprising:
    at least one disk with a circumference thereof provided with a through hole;
    a straightedge provided with a fixed post and a plurality of scales, and said fixed post penetrates through said through hole to fix said at least one disk to said fixed post; and
    a hitching line with one end thereof penetrated by said fixed post, and another end of said hitching line surrounds said at least one disk or straightens along said straightedge;
    wherein said at least one disk comprises a plurality of disks arranged on said fixed post, each of the plurality of disks has a diameter, and the diameters of said plurality of disks are sequentially reduced from bottom to top, and one of said plurality of disks with the largest diameter is arranged in a bottom.

2. The measurement tool for circumference according to claim 1, wherein said fixed post is arranged at said scale of said straightedge which is 0.

3. The measurement tool for circumference according to claim 1, wherein the one of said plurality of disks with the largest diameter, said straightedge and said fixed post are integrally formed as a piece.

4. The measurement tool for circumference according to claim 3, wherein a thickness of said one of said plurality of disks with the largest diameter is larger than a thickness of said straightedge, and said hitching line uses said fixed post to surround said one of said plurality of disks with the largest diameter.

5. The measurement tool for circumference according to claim 1, wherein said through hole is an arc recess.

6. The measurement tool for circumference according to claim 1, wherein said hitching line has a string and a loop arranged at one end of said string, and said loop hitches said fixed post.

7. The measurement tool for circumference according to claim 6, wherein a length of said string is larger than a length of said circumference of said at least one disk.

8. The measurement tool for circumference according to claim 1, wherein a length of said straightedge is larger than said length of said circumference of said at least one disk.

9. The measurement tool for circumference according to claim 6, wherein said string makes a circle around said circumference of said at least one disk, and said string is marked an index whose position corresponds to a position of said fixed post, and then said string straightens along said straightedge, and said length of said circumference of said at least one disk is obtained according to relative positions of said scales and said index.

* * * * *